(12) United States Patent
Ligh et al.

(10) Patent No.: US 8,166,119 B2
(45) Date of Patent: Apr. 24, 2012

(54) MESSAGING DEVICE FOR DELIVERING MESSAGES TO RECIPIENTS BASED ON AVAILABILITY AND PREFERENCES OF RECIPIENTS

(75) Inventors: Ming Ligh, Seattle, WA (US); Paulo S. T. Chow, North Bend, WA (US); Valerie Goulart, Bellevue, WA (US); Anthony Giardini, Bellevue, WA (US); Georgiana Gormley, Durham, NC (US); Bryan Gough, Seattle, WA (US); Patrick Carney, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 12/133,324

(22) Filed: Jun. 4, 2008

(65) Prior Publication Data

US 2009/0271486 A1 Oct. 29, 2009

Related U.S. Application Data

(63) Continuation-in-part of application No. PCT/US2008/061585, filed on Apr. 25, 2008.

(60) Provisional application No. 61/050,141, filed on May 2, 2008.

(51) Int. Cl.
*G06F 15/16* (2006.01)
*G06F 15/173* (2006.01)
*G06F 3/048* (2006.01)

(52) U.S. Cl. ......................... 709/206; 709/238; 715/810

(58) Field of Classification Search .......... 709/202–207, 709/238; 715/810
See application file for complete search history.

(56) References Cited

U.S. PATENT DOCUMENTS

| | | | |
|---|---|---|---|
| 5,579,472 A | | 11/1996 | Keyworth, II et al. |
| 5,973,692 A | * | 10/1999 | Knowlton et al. ............ 715/835 |
| 6,333,973 B1 | | 12/2001 | Smith et al. |
| 6,430,604 B1 | * | 8/2002 | Ogle et al. ..................... 709/207 |
| 6,490,614 B1 | * | 12/2002 | Shaffer et al. ................. 709/206 |
| 6,654,790 B2 | * | 11/2003 | Ogle et al. ..................... 709/206 |
| 7,035,923 B1 | * | 4/2006 | Yoakum et al. ............... 709/224 |
| 7,076,533 B1 | * | 7/2006 | Knox et al. ................... 709/217 |
| 7,363,345 B2 | * | 4/2008 | Austin-Lane et al. ........ 709/207 |
| 7,428,580 B2 | * | 9/2008 | Hullfish et al. ............... 709/207 |
| 7,680,892 B2 | * | 3/2010 | Knox et al. ................... 709/206 |

(Continued)

OTHER PUBLICATIONS

"OpenPeak Closes $30 Million Series C Funding." OpenPeak Software & Device Solutions. Nov. 14, 2007. [Retrieved May 16, 2008]. Retrieved from the Internet: <http://openpeak.com/Press_Funding.php>.

"Verizon Unveils Next-Generation 'FiOS FONE' Home Communications Center for FiOS Customers." OpenPeak Software & Device Solutions. Aug. 1, 2007. [Retrieved May 16, 2008]. Retrieved from the Internet: <http://www.openpeak.com/Press_Fios_Fone.php>.

(Continued)

*Primary Examiner* — George C Neurauter
(74) *Attorney, Agent, or Firm* — Perkins Coie LLP

(57) ABSTRACT

A messaging device facilitates delivery of messages to recipients based on availability and preferences associated with recipients. In some embodiments, messages are composed by a user via a touchscreen display. Icons representing potential message recipients are displayed, and the user may deliver a message to a recipient by associating the message with the icon that represents the desired recipient. The facility uses availability information—which reflects recipients' availability and willingness to communicate—and system- and recipient-defined preferences to determine the best method(s) of delivery for a message and other features of message delivery. Recipients' availability and preferences may be displayed to users on an interface. Users may make decisions regarding delivery method, timing, and other details of message delivery based on the displayed availability and preference information.

44 Claims, 10 Drawing Sheets

U.S. PATENT DOCUMENTS

| | | | |
|---|---|---|---|
| 7,783,592 | B2 | 8/2010 | Armstrong et al. |
| 2003/0052915 | A1* | 3/2003 | Brown et al. ............... 345/752 |
| 2003/0172287 | A1* | 9/2003 | Bailo et al. .................. 713/193 |
| 2004/0148346 | A1 | 7/2004 | Weaver et al. |
| 2005/0108329 | A1 | 5/2005 | Weaver et al. |
| 2005/0169446 | A1 | 8/2005 | Randall et al. |
| 2006/0075044 | A1 | 4/2006 | Fox et al. |
| 2006/0149816 | A1* | 7/2006 | Cadiz et al. ................. 709/206 |
| 2006/0168037 | A1* | 7/2006 | Audu et al. .................. 709/206 |
| 2006/0168049 | A1 | 7/2006 | Orozco et al. |
| 2006/0170669 | A1 | 8/2006 | Walker et al. |
| 2006/0285441 | A1 | 12/2006 | Walker et al. |
| 2007/0112915 | A1 | 5/2007 | Klassen et al. |
| 2007/0168863 | A1 | 7/2007 | Blattner et al. |
| 2007/0281676 | A1 | 12/2007 | Borras et al. |
| 2008/0040436 | A1 | 2/2008 | Setlur et al. |
| 2008/0055263 | A1* | 3/2008 | Lemay et al. ............... 345/173 |
| 2008/0153459 | A1* | 6/2008 | Kansal et al. ............. 455/412.1 |
| 2008/0231635 | A1 | 9/2008 | Saund |
| 2008/0309617 | A1 | 12/2008 | Kong et al. |
| 2009/0117942 | A1* | 5/2009 | Boningue et al. ............ 455/564 |
| 2009/0181702 | A1 | 7/2009 | Vargas et al. |
| 2009/0217180 | A1* | 8/2009 | Tovino et al. ................ 715/762 |
| 2009/0271712 | A1 | 10/2009 | Ligh et al. |
| 2009/0286558 | A1 | 11/2009 | Zufi et al. |
| 2010/0005138 | A1* | 1/2010 | Manzano ..................... 709/203 |
| 2010/0218119 | A1* | 8/2010 | Scott ............................ 715/752 |
| 2011/0078271 | A1* | 3/2011 | Ito et al. ...................... 709/206 |
| 2011/0106620 | A1* | 5/2011 | Setiawan et al. ........... 705/14.49 |

OTHER PUBLICATIONS

International Search Report and Written Opinion for PCT/US2008/061585; Applicant: T-Mobile USA, Inc.; Date of Mailing: Sep. 10, 2008, 10 pages.

International Search Report and Written Opinion for PCT/US2009/041733; Applicant: T-Mobile USA, Inc.; Date of Mailing: Jun. 16, 2009, 9 pages.

Keating, Tom. "Cool Phone for FiOS, Uverse and other VoIP providers." VoIP & Gadgets Blog. 2008. [Retrieved on May 16, 2008]. Retrieved from the Internet: <http://blog.tmcnet.com/blog/tom-keating/triple-play/cool-phones-for-fios-uverse-and-other-voip-providers.asp>.

Pages from OpenPeak Software & Device Solutions, 21 pages. [Retrieved on May 16, 2008]. Retrieved from the Internet: <http://www.openpeak.com/.

Segan, Sascha. "The iPhone of Home Phones." PCMAG.com. Aug. 1, 2008. [Retrieved on May 16, 2008]. Retrieved from the Internet: <<http://www.pcmag.com/article2/0,2817,2246158,00.asp>.

Tingle, Andrew. "OpenPeak OpenFrame Touch Screen Home SmartPhone Offering VoIP, Internet & Multimedia Functionality." Technology, Gadgets and Curiosities: From cutting edge, to over the edge to the truly bizarre. 2008. [Retrieved on May 16, 2008]. Retrieved from the Internet: <http://nexus404.com/Blog/2008/03/15/openpeak-openframe-touch-screen-home-smartphone-voip-internet-multimedia-functionality/>.

* cited by examiner

| Recipient identifier | Recipient icon | Recipient addresses | | Preferred delivery methods | | Group membership |
|---|---|---|---|---|---|---|
| Mom | mom.bmp | phone | (200) 555-1212 | 1 | phone | Family |
| | | email | Mom@hotmail.com | 2 | email | Parents |
| | | digital picture frame | 192.168.0.2 | 3 | eBoard | |
| | | eBoard | 192.168.0.4 | | | |
| Dad | golfer.png | phone | (200) 555-1214 | 1 | SMS | Family |
| | | SMS | (200) 555-1214 | 2 | phone | Parents |
| | | email | Dadlovesgolf@gmail.com | 3 | email | |
| | | eBoard | 192.168.0.4 | | | |
| John | johnkarate.bmp | phone | (200) 555-1216 | 1 | SMS | Family |
| | | SMS | (200) 555-1216 | 2 | phone | Kids |
| | | IM | JohnJohn | 3 | IM | |
| | | eBoard | 192.168.0.4 | | | |
| Kate | kate12.bmp | phone | (200) 555-1218 | 1 | phone | Family |
| | | SMS | (200) 555-1218 | 2 | SMS | Kids |
| | | email | SoccerKate@gmail.com | 3 | IM | Kate's Soccer Team |
| | | IM | SoccerKate | 4 | email | |
| | | eBoard | 192.168.0.4 | | | |

Figure 5

MESSAGING DEVICE FOR DELIVERING MESSAGES TO RECIPIENTS BASED ON AVAILABILITY AND PREFERENCES OF RECIPIENTS

CROSS-REFERENCE TO RELATED APPLICATION(S)

This application is a continuation-in-part of International Application No. PCT/US08/61585, entitled MESSAGING DEVICE HAVING A GRAPHICAL USER INTERFACE FOR INITIATING COMMUNICATION TO RECIPIENTS, filed Apr. 25, 2008. This application claims the benefit of U.S. Provisional Application No. 61/050,141 entitled MESSAGING DEVICE FOR DELIVERING MESSAGES TO RECIPIENTS BASED ON AVAILABILITY AND PREFERENCES OF RECIPIENTS, filed May 2, 2008.

BACKGROUND

Traditionally, people leave handwritten notes for family members, friends, co-workers, and others in "can't miss" places to ensure that their messages are received. For example, paper messages may be pinned on bulletin boards, post-it notes may be attached to computers or chairs, notes may be left on counters, etc. As people's lives become increasingly busy, however, it can be challenging to communicate constant changes in plans and schedules, as the traditional handwritten note is not very effective for communicating promptly with others. Some of the shortcomings associated with physical messages may be overcome by the use of electronic messages. Electronic messages have the advantage of being quickly delivered to a user.

Determining how to send a message to users, however, is becoming an increasingly challenging problem. Each user to whom a message is addressed may have several electronic devices, including a mobile phone, one or more computers, a personal digital assistant (PDA), and other devices. Each user may also have access to various electronic services via his or her electronic devices, including voice and text messaging, email, instant messaging, and other services. In addition, a user's availability for communication with others via each of the user's devices and services may vary over time, including throughout the day. With so many devices and communication services, and the ever-changing availability of users via their devices and services, it can be difficult to coordinate communication with family members, friends, co-workers, and others. The need therefore exists for a system that overcomes the above limitations, in addition to providing other benefits.

BRIEF DESCRIPTION OF THE DRAWINGS

FIG. 5 is a block diagram of a representative data structure for storing recipient identifiers, icons, addresses, and other information associated with recipients.

DETAILED DESCRIPTION

Figure 1:
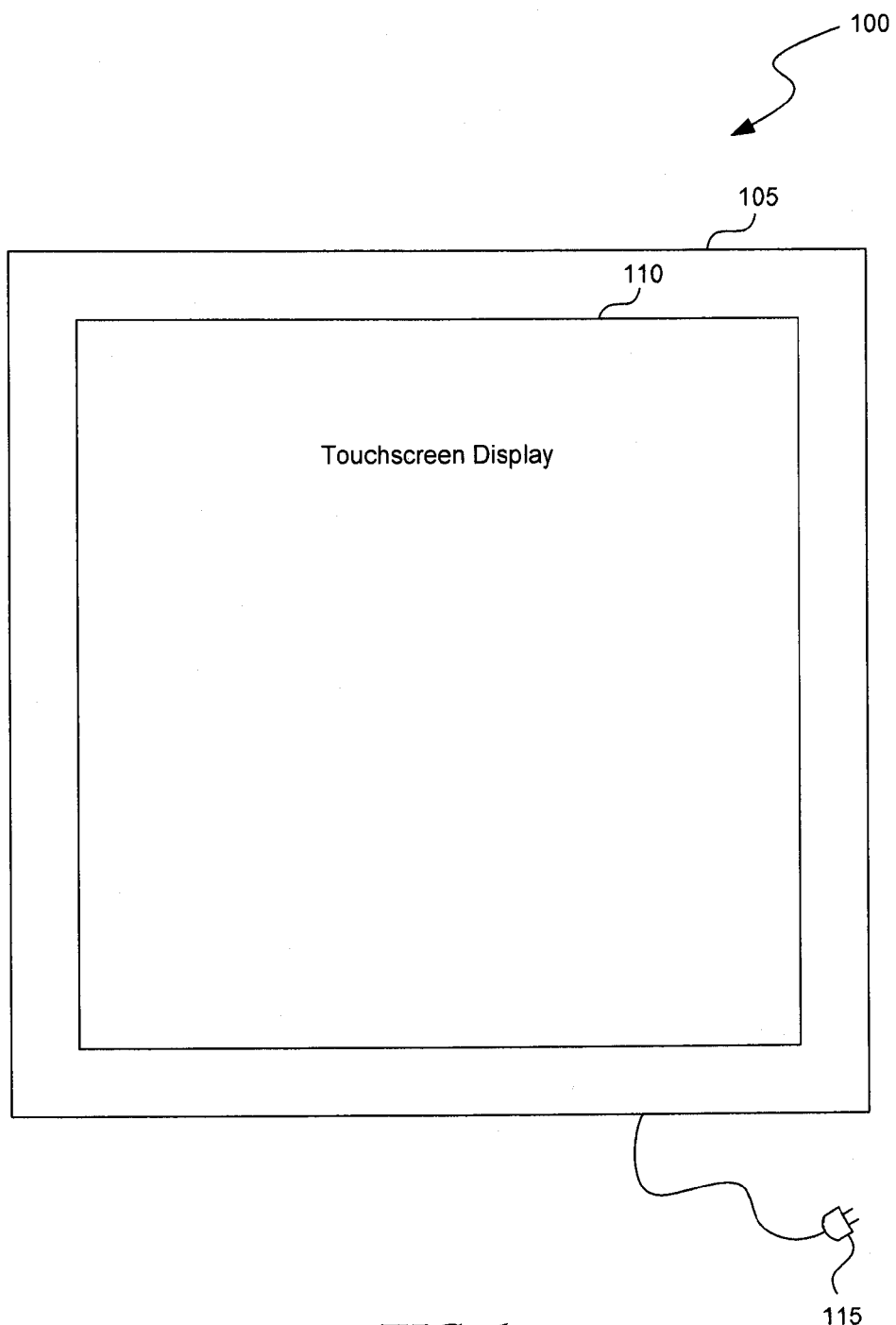
FIG. 1 is a block diagram of a representative device having a graphical user interface for initiating communication to recipients.

A hardware and/or software facility for delivering messages to recipients based on availability and preferences of the recipients is described. The facility may be incorporated in an electronic messaging device (referred to herein as an "eBoard") having a touchscreen display and centrally located in a high-traffic location where it may be used by several individuals such as family members, friends, or business associates to communicate and to stay coordinated. Messages are composed by a user via the touchscreen display or an attached data entry device of the eBoard. Icons representing potential message recipients are displayed, and the user may deliver a message to a recipient by associating the message with an icon that represents the desired recipient. Such association may take place by a "drag-and-drop" motion, a "pop-and-hop" motion, or another association command. The user may be presented with one or more interfaces to allow the user to specify additional details about the delivery of the message. For example, the user may indicate to which of the recipient's various electronic devices the message is to be delivered, which of the recipient's various messaging services should be used to deliver the message, and the timing of the message delivery. The user may also indicate the importance or priority of the message to be delivered.

The facility utilizes information regarding the availability and preferences of recipients to facilitate the delivery of messages to recipients. Availability information includes indications of recipients' locations, activities, device capabilities and sensors, services accessed by recipients' devices, schedule information, and other information that reflects recipients' availability and willingness to communicate. In addition, the system and/or recipients may set preferences that specify how messages are to be delivered. The facility may utilize availability and preference information associated with a recipient to select an appropriate delivery method or methods for delivering a message to the recipient. In addition, the facility may use availability and preference information to make determinations regarding the timing and other details of message delivery. The facility may also display recipients' availability and/or preference information on one or more interfaces, to assist an eBoard user in selecting an appropriate delivery method, timing, and other details for each message delivery.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

FIG. 1 is a block diagram illustrating a representative eBoard 100 in which the facility may be incorporated. eBoard 100 includes a touchscreen display 110 that may be bordered by a frame 105. The touchscreen display can detect the location of touches on the display using any of a variety of touchscreen technologies, such as resistive, capacitive, infrared, surface acoustic waves, strain gauge, optical imaging, acoustic pulse recognition, dispersive signal or other technology. A touchscreen display 110 allows a user to directly interact with the content of the display, without the need for a keyboard, mouse, or other input device. For example, a user may touch the display 110 with a stylus, finger, or other implement in order to input content on the display, select items on the display, modify the content of the display, and take other user actions associated with the content depicted on the display. An attached data entry device, such as a keyboard, mouse, microphone, webcam or other input device may optionally be connected (wired or wirelessly) in order to interact with the eBoard 100. For example, the eBoard may be accessed by a remote or satellite device connected to the eBoard via 801.11 or "Wi-Fi," Bluetooth, or similar connection, by which the satellite messaging device accesses the eBoard's functionality remotely. The eBoard 100 may also include a plug 115 that connects the eBoard 100 to a power source. The eBoard may be mounted on a vertical surface, or set up on a horizontal surface, where it can be accessed by several individuals. For example, the eBoard may be mounted in a kitchen for use by family members, in a conference room for use by a team of employees, in a dormitory for use by student residents, etc. While a vertical mounting is depicted in the figures, it will be appreciated that the eBoard may be horizontally mounted or mounted at an angle to facilitate use of the eBoard.

Figure 2:
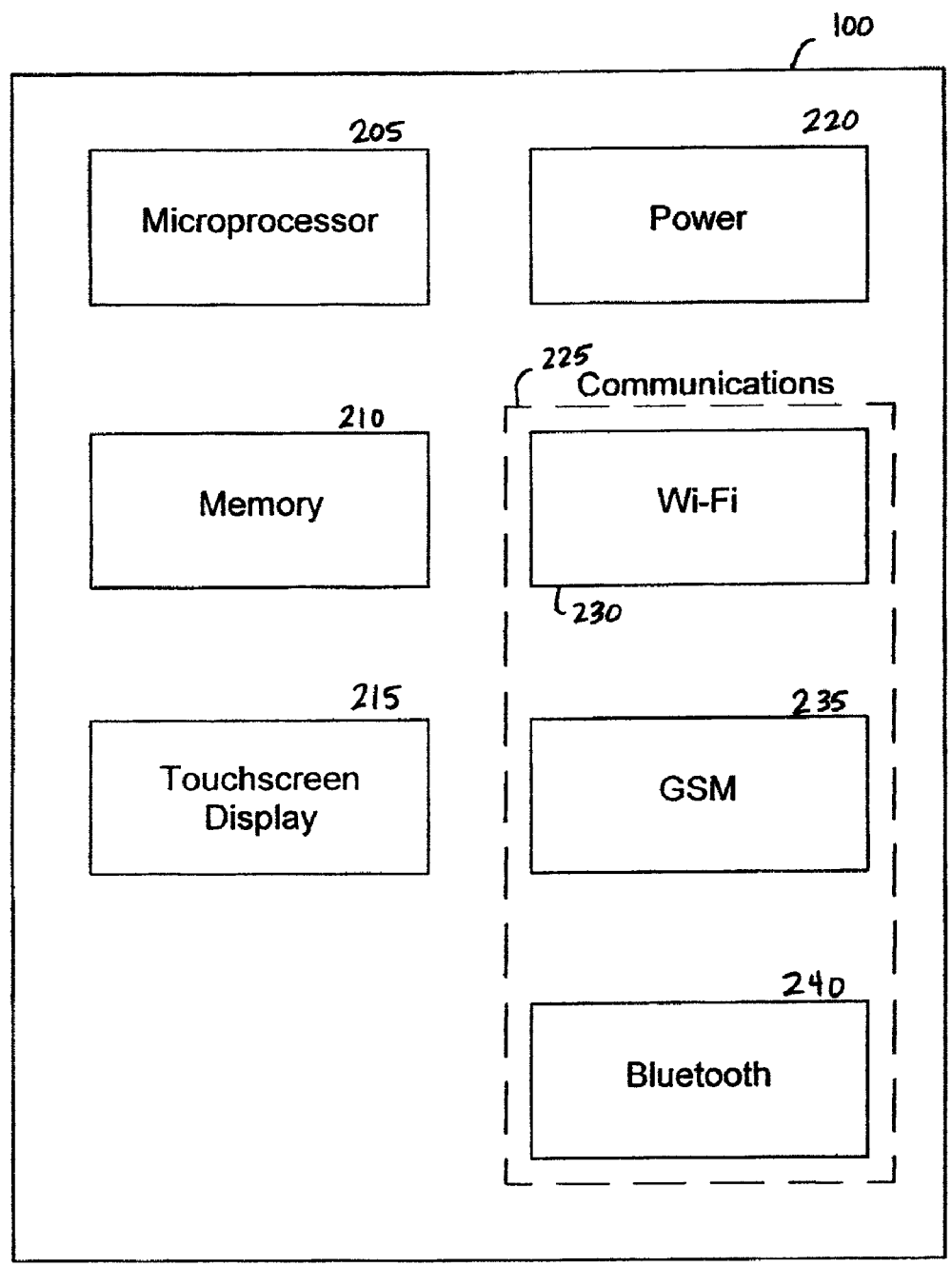
FIG. 2 is a block diagram of representative components of a device having a graphical user interface for initiating communication to recipients.

FIG. 2 is a block diagram illustrating representative components of the eBoard 100 that may incorporate the disclosed facility. eBoard 100 may include a microprocessor 205, a memory component 210, a touchscreen display 215, a power component 220, and various communications components 225. Memory component 210 may be a magnetic media drive, optical media drive, other non-volatile memory, flash memory, and so on, capable of storing operational software and messages including text, audio, video, images, and other types of media. Power component 220 provides power to the eBoard 100 and the components of the eBoard. Communications components 225 may include a Wi-Fi component 230 for wireless electronic communication, a GSM component 235 for mobile phone communication, and a Bluetooth component 240 for short range wireless communication. Communications components 225 may also include wired communication, such as a USB or FireWire connection, other forms of wireless communication such as GPRS, EDGE, or UMTS, and so on. eBoard 100 may also include other components not specifically described herein.

Figure 3:
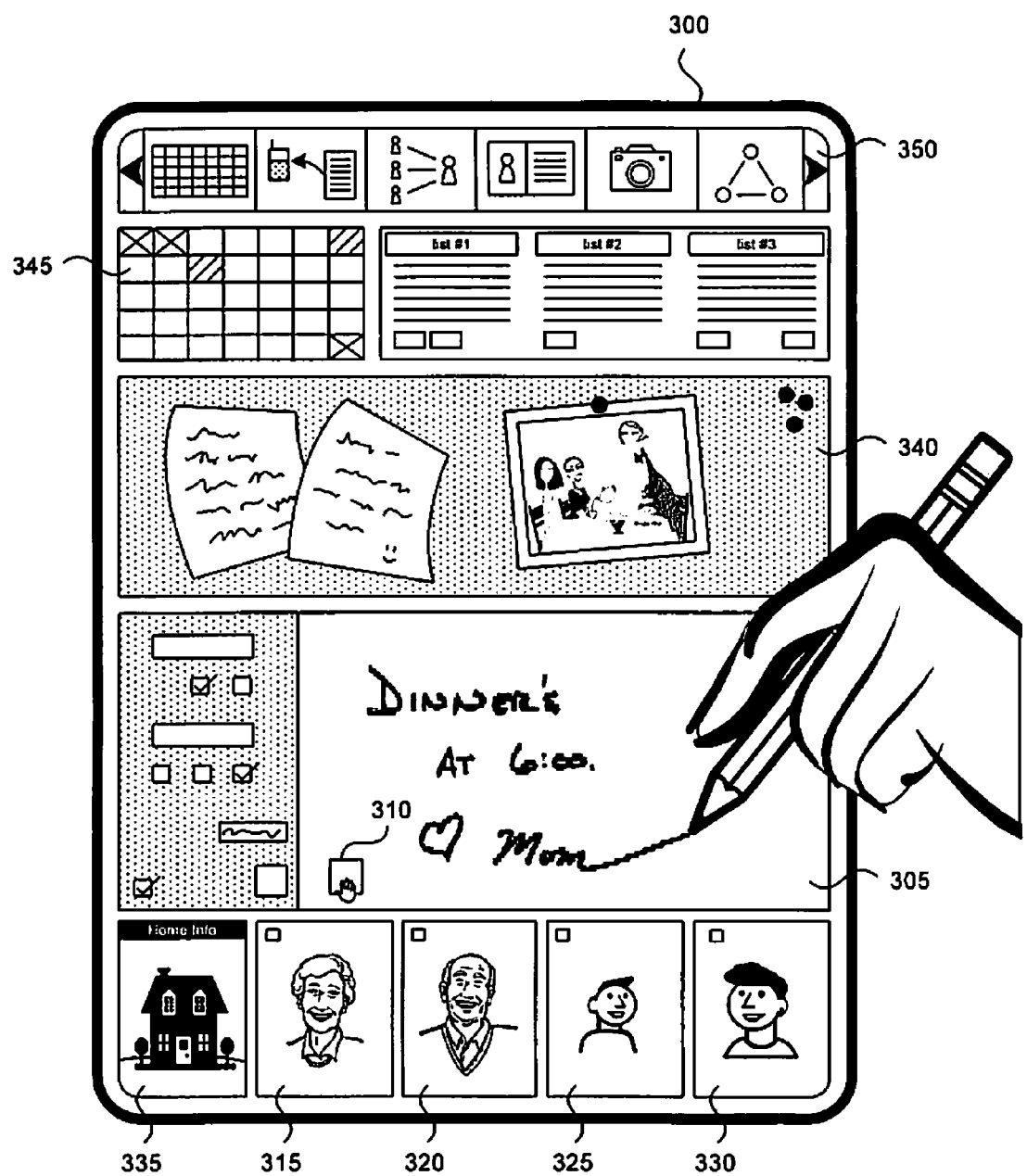
FIG. 3 is a representative screenshot of a graphical user interface for initiating communication to recipients.

FIG. 3 is a representative screenshot of a graphical user interface 300 generated by the facility for initiating communication to recipients. As will be described in additional detail herein, the interface may be used for composing and sending electronic messages to one or more recipients, such as the recipients identified by icons 315, 320, 325, 330, and 335. The interface may contain various features, including an electronic message composition area 305, a bulletin board 340, a calendar 345, a menu 350 for accessing applications and files, and other features. The interface generated by the facility may be used for a variety of functions in addition to allowing a user to compose and deliver electronic messages, such as allowing a user to maintain a calendar, display digital photographs, pay bills, access applications and files, and other functions.

Figure 4:
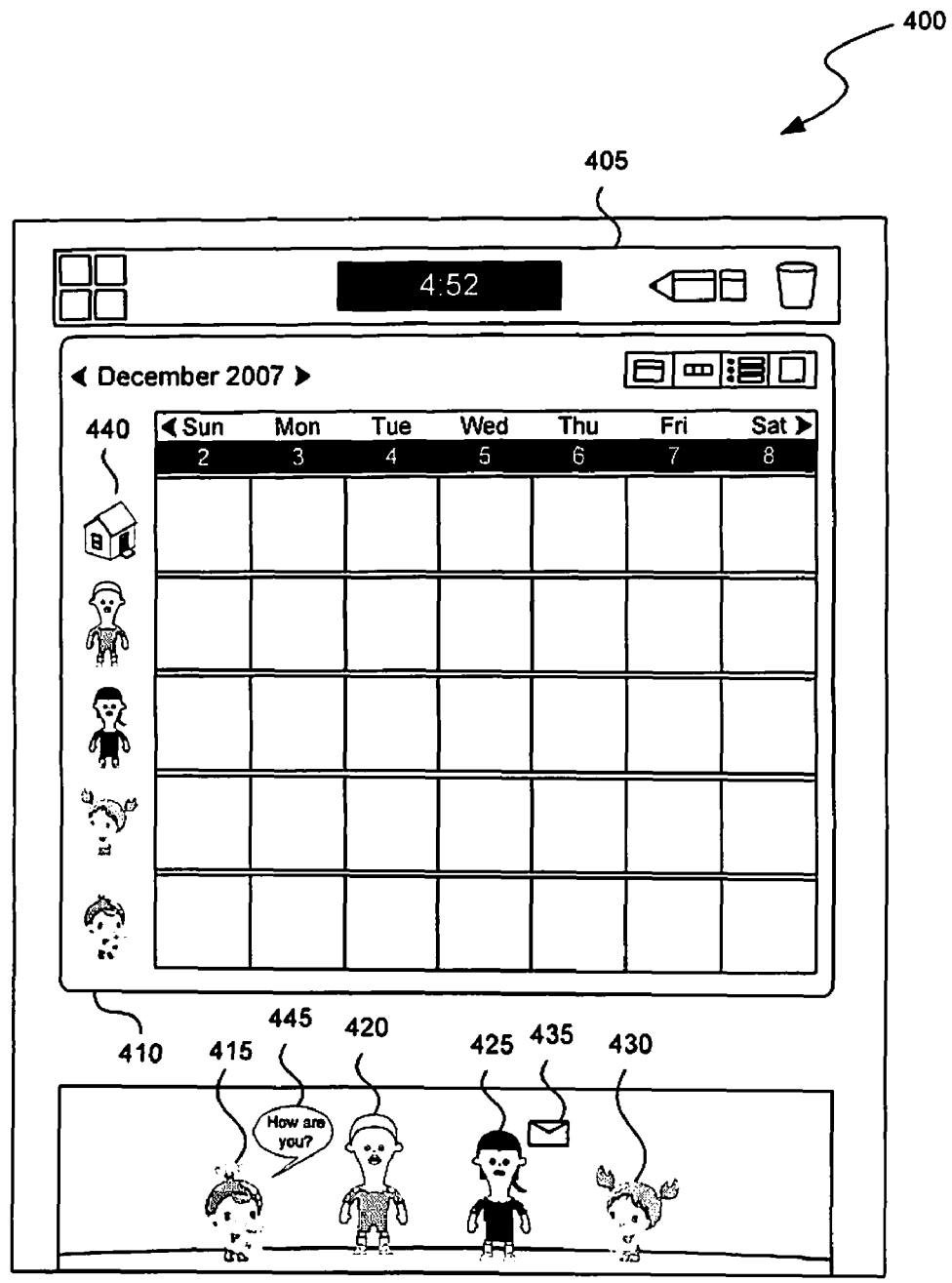
FIG. 4 is a representative screenshot of an alternative graphical user interface for initiating communication to recipients.

FIG. 4 is a representative screenshot of an alternative graphical user interface 400 generated by the facility for initiating communication to recipients. The interface 400 contains recipient icons 415, 420, 425, and 430. The interface 400 also includes a calendar, which may include entries for each recipient identified by the recipient icons 415, 420, 425, and 430, in addition to entries for the entire family. The family may be represented by a group icon 440. In addition, the interface 400 includes a menu 405 by which messages may be composed and other features may be accessed by the user.

In some embodiments, the facility allows a user to configure the graphical user interface by specifying commonly used or potential message recipients that should be depicted in the interface. Such message recipients may include, for example, the user's family members, friends, co-workers, the user himor herself, and other recipients. Message recipients may also include one or more devices capable of receiving communications, such as a digital picture frame or a satellite messaging device, regardless of the identity of the person(s) who own and/or use such devices. In some embodiments, each recipient added by the user is identified on the interface by an icon, photograph, or other graphic (hereinafter collectively referred to as "icons"). FIG. 3 shows four individual recipient icons 315, 320, 325, and 330 that have been added to the interface 300. For example, icon 315 may represent Dad, icon 320 may represent Mom, icon 325 may represent their son, John, and icon 330 may represent their daughter, Kate. FIG. 3 also shows one group recipient icon 335 that has been added to the interface. The group recipient icon may represent a group of recipients, such as all of the displayed family members.

In some embodiments, when the facility is provided with one or more recipients to display in the interface, the facility may allow the user to select an icon that represents each recipient. The icon may be selected from a library of icons provided by the facility, an on-line repository or an on-line retail location, from digital photos from the user's digital photo album, from an electronic drawing created by the user via the graphical user interface, or in another manner. Alternatively or additionally, each recipient may pre-define an icon that identifies him- or herself, the icon being selected by the recipient from the same or different sources as are used by a user to select an icon. If an identifying icon has been pre-defined by a recipient, the user may be required to use the pre-defined icon, or the user may assign another icon to represent the recipient. If no icon is selected by the user or pre-defined by a recipient, the facility may assign a default icon for the recipient.

The facility stores recipient identifiers and icons, in addition to other information associated with recipients, in an appropriate data structure. FIG. 5 is a block diagram illustrating a representative data structure 500 that may be used by the facility to store recipient identifiers, icons, addresses, and other information associated with recipients. Data structure 500 may reside in device memory 210, may be stored at a location remote from the device 100, or may be stored in another manner. The data structure contains a unique identifier for each recipient that is depicted on the interface. A recipient identifier may be a name, nickname, identification number, phone number, or other identifier associated with the recipient. For example, column 505 of FIG. 5 depicts recipient identifiers "Mom," "Dad," "John," and "Kate" —i.e., names associated with each of the recipients. In addition, the data structure may contain indications of icons that identify each of the recipients on the interface. Icons may be referenced by file names, pointers, identification numbers, or in another manner. For example, column 510 of FIG. 5 depicts icon file names associated with each of the recipients, including "mom.bmp" associated with Mom and "golfer.png" associated with Dad. Those skilled in the art will recognize that icons and icon names may be dynamic and allow the display of icons to change dynamically based on a recipient's presence and availability information.

For each recipient that is added by a user, the user may provide to the facility one or more addresses that may be used to establish communication with that recipient. Recipient addresses may include email addresses to establish email communication, instant messaging addresses to establish IM communication, phone numbers to establish voice or data communication, IP addresses or session initiation protocol (SIP) uniform resource identifier (URI) as specified in RFC 3261 to establish device communication, and any other address that would allow the user to communicate with the recipient. In some embodiments, once a recipient has been identified by the user to the facility, the recipient may be allowed access by the facility to update the stored address information. For example, a recipient may be able to send a new email address to the facility or may be able to modify an existing phone number that is stored by the facility.

Once provided, recipient addresses are stored by the facility in an appropriate data structure. For example, recipient addresses may be stored along with recipient identifiers and icons in data structure 500 described above. Recipient addresses may also be stored by the facility in a separate data structure. Column 515 of FIG. 5 illustrates representative recipient addresses that may be stored by the facility. For example, row 530 depicts four addresses associated with Mom—a phone number, an email address, an IP address for a digital picture frame, and an IP address for an eBoard. In addition, row 535 depicts four addresses associated with Dad—a phone number assigned to both voice ("phone") and text ("SMS") communications, an email address, and an IP address for the eBoard shared with Mom and the rest of the family. One skilled in the art will appreciate that each recipient may have a different number of associated addresses, that multiple addresses may be associated with the same method of communication (e.g., a recipient may have two or more email addresses), and that addresses associated with recipients may vary in other ways.

In addition to recipient identifiers, icons, and addresses, the facility may store other information associated with recipients in an appropriate data structure. This information may include recipients' preferred delivery methods and group membership. For example, data structure 500 contains preferred delivery methods in column 520 and group membership in column 525. As will be described in additional detail herein, each recipient can indicate his or her preferred methods of delivery. For example, row 530 of FIG. 5 illustrates that Mom has indicated that she prefers to be contacted first by phone, then by email, and finally by leaving messages on the eBoard. As will also be described in additional detail herein, each recipient may be part of one or more groups of recipients. For example, row 545 of FIG. 5 indicates that Kate is part of three groups—"Family," "Kids," and "Kate's Soccer Team." While FIG. 5 depicts a table whose contents and organization are designed to make it more comprehensible to the reader, those skilled in the art will appreciate that the actual data structure used by the facility to store this information may differ from the table shown. For example, the data structure may be organized in a different manner, may contain more or less information than shown, may be compressed and/or encrypted, and may otherwise be optimized in a variety of ways.

Once the user has configured the interface by adding potential message recipients to the interface and providing addresses that may be used to establish communication with the recipients, the facility allows messages to be composed by a user via the interface. A message composed by the user may include any type of electronic content, including voice, audio, pictures, video, a typed or (electronically) handwritten note, a drawing, a calendar event, and other types of electronic content. For example, the user may use a stylus, finger, or other implement to generate a handwritten note on a message area 305 of the interface 300. This message area 305 may resemble a whiteboard, chalkboard, notepad, or other surface for receiving a note. As another example, the facility may permit the user to record a voice message via the graphical user interface. This message may be sent to a recipient as a voice message, or the facility may transcribe the voice message and send the transcription to a recipient, such as via email or SMS message. Representative software for performing the conversion may be a product like Dragon NaturallySpeaking by Nuance Communications. In some embodiments, pre-existing messages—such as an email message, video, audio file, or other electronic communication stored by or available to the facility—may be retrieved by the user via the graphical user interface. For example, applications and files may be accessible to the user via a menu 350 on the interface 300.

The facility determines which user has composed the message and/or initiated delivery of the message. The user may manually indicate his or her identity using text entry, selection of an identity from a menu, selection of an icon representing the user, etc. Alternatively, the facility may automatically identify the user in a variety of ways, including fingerprint recognition, voice or facial recognition, handwriting recognition, optical character recognition (OCR), a camera associated with the interface, and in other ways. Identification may also encompass the use of near field communications, such as RFID or short range radio devices. The determination of which user has composed or initiated delivery of (or will compose or initiate delivery of) a message may be determined before, during, or after the message has been composed or delivery has been initiated. By identifying the user, the facility may notify the recipient who is the sender of the message. For example, the facility may populate a "From:" field in an email or SMS message with the user's name or other identifier.

Once a message has been composed by the user, the user uses the touchscreen display to associate the message with one or more intended recipients. One technique for associating the message with recipient(s) is for the user to drag-and-drop the message onto the icon(s) of the desired recipient(s) or onto the contact name(s) or address(es) of the recipient(s) in an address book or contact list. The dragging-and-dropping of a message may be accomplished through any of a variety of methods, including touching the message with one or more styluses, fingers, or other implements, pulling the message to its intended location(s) via the implement(s), and releasing the implement(s). For example, if Mom has composed a message 305 to Dad, Mom may touch the message 305 with a stylus, drag the message 305 onto Dad's icon 315 using the stylus, and release the stylus. Another technique for associating the message with recipient(s) is a "pop-and-hop" motion in which the user taps the message once, multiple times, or in a pattern, and then taps the desired recipient(s)

once, multiple times, or in a pattern. Again, the "pop-and-hop" association of message and recipient(s) may be accomplished via one or more styluses, fingers, or other implements. In some embodiments, the user may initiate association of a message with a recipient by touching an implement anywhere on the message 305, while in other embodiments the user may initiate association of a message with a recipient by touching a particular portion of the message 305. For example, a particular portion of the message 305, such as icon 310, may activate the association, while other portions of the message 305 are inactive for initiating association. In some embodiments, when the user is engaged in associating a message with a recipient, once the dragging or successive tapping motion touches, or is within the vicinity of, a recipient's icon, the facility may display an indication that this recipient is the active selection. For example, the facility may highlight or enlarge the recipient's icon, or otherwise indicate that if the user releases the dragging or tapping motion that the message will be delivered to the active recipient.

In some embodiments, users define electronic message content and the recipients to whom the message content will be delivered. Users are not required to define how message content is to be packaged and/or delivered to the recipients. For example, the user is not required to specify whether a text message should be delivered via SMS or email, and the user is not required to specify the address of the recipient. Instead, the facility determines how to package and deliver user-defined message content, such as based on a default delivery method, availability and preferences of recipients, and/or other factors.

In some embodiments, once the user has indicated that a message is to be delivered to one or more recipients, the facility automatically transmits the message to the recipient(s) using a default delivery method. The facility may allow the user to specify the default delivery method when initially storing information about the recipient. Alternatively, the facility may automatically send the message using the last-used delivery method to that recipient absent some indication from the user to change the delivery method.

Figure 8:
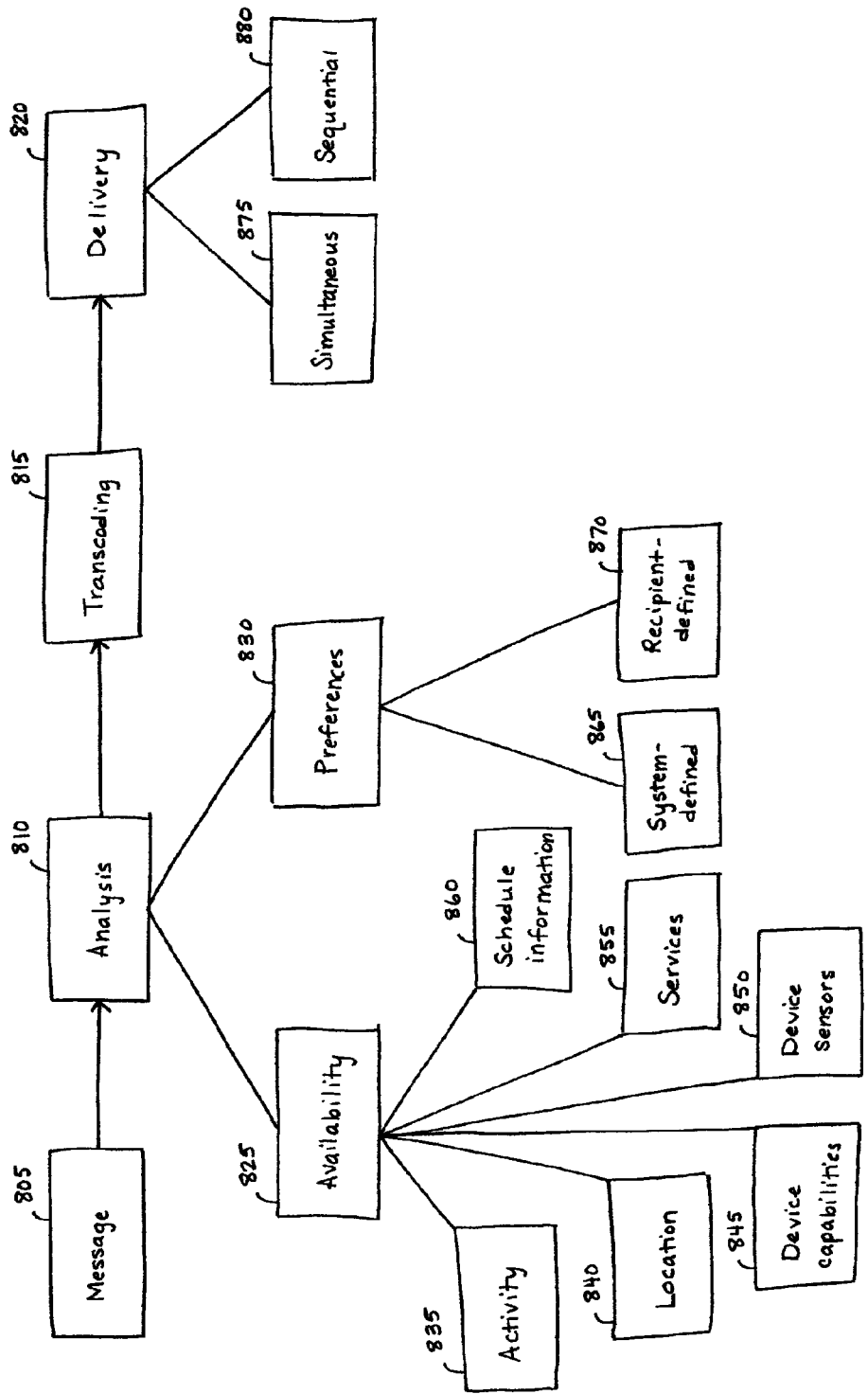
FIG. 8 is a block diagram illustrating processing steps associated with the delivery of a message to a recipient based on availability and preference information.

In some embodiments, the facility selects a delivery method based on the availability and preferences of the recipient. FIG. 8 illustrates processing steps associated with the delivery of a message to a recipient based on availability and preference information. After a message 805 has been composed by a user and associated with a recipient, the facility may analyze 810 a recipient's availability 825 and preferences 830 associated with the recipient to determine the best method or methods for delivery of the message to the recipient. As described herein, a delivery method encompasses the format of the message that is being sent (e.g., audio, text, video), the service that is to be used to send the message (e.g., SMS, email, voice channel), and the electronic device associated with the recipient to which the message is delivered (e.g., pager, mobile phone, BlackBerry, eBoard). It will be appreciated that the selected delivery method may not be based on all of these factors. If, for example, the device of the recipient is not known, then the selected delivery method may encompass only the format of the message and the service used to send the message.

Depending on the delivery method or methods selected by the facility, the message may be transcoded 815 to convert the message from one format to another format (e.g., from a voice message to a text message). The message is then delivered 820 by the facility using the selected method or methods. Among other benefits, delivering messages based on the availability and preferences associated with a recipient assures the user and the recipient that messages are delivered to the recipient in the most media-rich format that is available at the time, that messages are delivered to the recipient in a timely manner, that messages are delivered to an appropriate device or service of the recipient, and that messages are delivered to the recipient according to methods that are preferred by the recipient. One skilled in the art will appreciate that the analysis 810 may be preformed by the facility during or after message composition.

When performing the analysis to determine the best method to deliver a message to a recipient, the facility may take into account a recipient's availability 825 and preferences 830 associated with the recipient. Availability information is any information that indicates that it is feasible to deliver the message to an individual and that the individual is accessible and/or willing to receive the message. For example, the availability of a recipient may be assessed by the recipient's current activity 835, location 840, device capabilities 845, device sensors 850, services 855 accessed by the recipient's devices, schedule information 860, or other information that relates to the availability of the message recipient. Each of these measures of availability will be discussed in additional detail herein. The facility may use the availability information to select available delivery methods for sending a message to the recipient. In addition, the facility may use availability information to make determinations regarding the timing and other details of message delivery. The facility may also display recipients' availability information to assist an eBoard user in selecting an appropriate delivery method, timing, and other details for each message delivery when such decisions are manually made by the user.

A variety of types of information may be used to assess the availability 825 of the user. One measure of a recipient's availability is activity information 835 which reflects a current activity in which the recipient is participating or a state of the recipient. Examples of activity information that reflects an activity or state of a recipient include "available," "online," "busy," "away," "do not disturb," "be right back," "in a meeting," "driving," "unavailable," and other indications. A recipient's activity information may be indicated in a responsive message to a message sent from the eBoard, such as a responsive "out of office" response. As another example, if the recipient does not wish to be interrupted for a period of time, the recipient may manually enter an indication of "do not disturb" that is transmitted directly to the eBoard. A recipient's activity information may also be automatically determined by the recipient's device, service, or the facility. For instance, the recipient may subscribe to certain availability or presence services, via a wireless telecommunications provider or otherwise, that interact with the recipient's devices, and the recipient may designate the eBoard to receive such activity information. For example, if a recipient is logged in to an IM service, the service may indicate to the availability or presence service, or directly to the eBoard, that the recipient is "online." The facility may use the activity information to select the recipient's device that should receive a message. For example, if the facility determines that a user is currently online on a laptop computer, a message may be sent to the recipient's IM service (accessible via the laptop) rather than to the recipient's cell phone.

Another measure of a recipient's availability is location information 840 which conveys a current physical location of the recipient. Examples of location information indicating a recipient's location include "at home," "at office," "in San Francisco," "at Starbucks," "at the corner of First and Union," "at the Seattle Art Museum," etc. A recipient's location may be determined based on GPS, RFID, or another location-based service associated with the recipient's mobile device and provided to the facility. In addition, a recipient's location may be approximated based on information received from network elements, such as a Wi-Fi or cellular network location, and such information provided to the facility. For example, with reference to FIG. 2, the eBoard communications components 225 may be used by the facility to determine the proximity of a recipient's electronic device to the eBoard 100. If a recipient's phone is detected by Bluetooth component 240, the facility may conclude that the phone is within the same physical location as the location of the eBoard. The location information may provide a precise location of the recipient, such as a street address or GPS coordinates, or more general location information, such as the city or time zone in which the recipient is located. The facility may use the location information to select the recipient's device that should receive a message. For example, if the facility determines that a recipient is at the grocery store, the facility may send the message to the recipient's mobile phone rather than to the recipient's office computer.

Still another measure of a recipient's availability is information related to the capabilities of a recipient's electronic devices 845. The capability of an electronic device includes both the technical performance characteristics of a device, such as the capability to receive a message in a particular format, as well as the capabilities of the network to which the device is currently connected. For example, if a user has composed a message that includes an image and a recipient's device does not support images, the facility may send a version of the message that does not include images to the device. Alternatively, the facility may send the original message (including the image) to another of the recipient's devices that supports images. As another example, a recipient's device may not currently be connected to a network which allows the delivery of video to the device, so the facility may instead transmit a version of the message with a small number of representative still images.

Yet another measure of a recipient's availability is information derived from sensors in a recipient's devices 850. For example, device sensors may monitor device power sources, remaining memory to receive and store a message, movement, proximity, and other features. The facility may use information received from device sensors to determine the best delivery method or methods for delivering a message to the recipient. As an example, if a user wants to leave a voice message to a recipient and the recipient's mobile phone is running low on battery power, the facility may convert the message to text and send a text message to the recipient's mobile phone to conserve power. Alternatively or additionally, the facility may send the voice message to another of the recipient's devices or services, such as an email account. As another example, an accelerometer embedded in a mobile device may indicate whether a device is currently being used horizontally or vertically by the recipient. Based on the information received from the accelerometer, the facility may determine a proper orientation—horizontal or vertical—for delivery of a message that includes an image.

Yet another measure of a recipient's availability is information related to services 855 accessed by a recipient via an electronic device. This type of availability information may indicate the services currently being accessed by a recipient, features of the recipient's mobile device or service plan, and other information pertaining to services accessed by the recipient. For example, services-related information may indicate that the recipient is currently on his/her mobile phone, the recipient is not on his/her mobile phone but the mobile phone is in an active state and registered on a wireless telecommunications network, or the recipient is currently logged in to IM. As another example, services-related information may indicate that the recipient has free SMS and MMS messaging included in the recipient's mobile device plan, that the recipient has a certain number of free voice minutes left for the month, and other features of the recipient's mobile device plan. The facility may use services-related information to make determinations about the best method or methods for delivery of a message to the recipient. For example, if a recipient is charged by his provider each time he receives a text message on his mobile device, the facility may not send text messages to the recipient, or the facility may send text messages only as a last resort. As another example, if a user has recorded a voice message for a recipient and the recipient is out of voice minutes for the month, the facility may deliver the voice message to the recipient's email account or may transcribe the voice message and send it by text to the recipient's mobile phone.

Yet another measure of a recipient's availability is schedule information 860 associated with the individual. Schedule information may be manually entered by the recipient, automatically inferred from a user's calendar and/or location, obtained from a Web-based calendar, obtained from a calendar maintained on a network location, or determined in another manner. Schedule information may be used by the facility to determine the best delivery method or methods for delivery of a message to a recipient, in addition to determining preferred timing and other features of message delivery. For example, the facility may conclude from a recipient's schedule that the user is at work at 8:00 am on a particular morning because of a scheduled meeting that morning, and may select a work phone number or email address over a home phone number or email address for messages delivered at that time. In addition, the facility may make message delivery determinations based on a recipient's future availability. For example, the facility may ensure that a message is delivered before or after a lengthy meeting on the recipient's calendar, or may deliver the message in a non-intrusive format, such as by email, during the meeting. The facility may also make determinations regarding the method, timing, and other features of message delivery based on upcoming dates, including birthdays and other important events. For example, the facility may use a user's schedule information to ensure that a message is delivered on a recipient's birthday.

Figure 9:
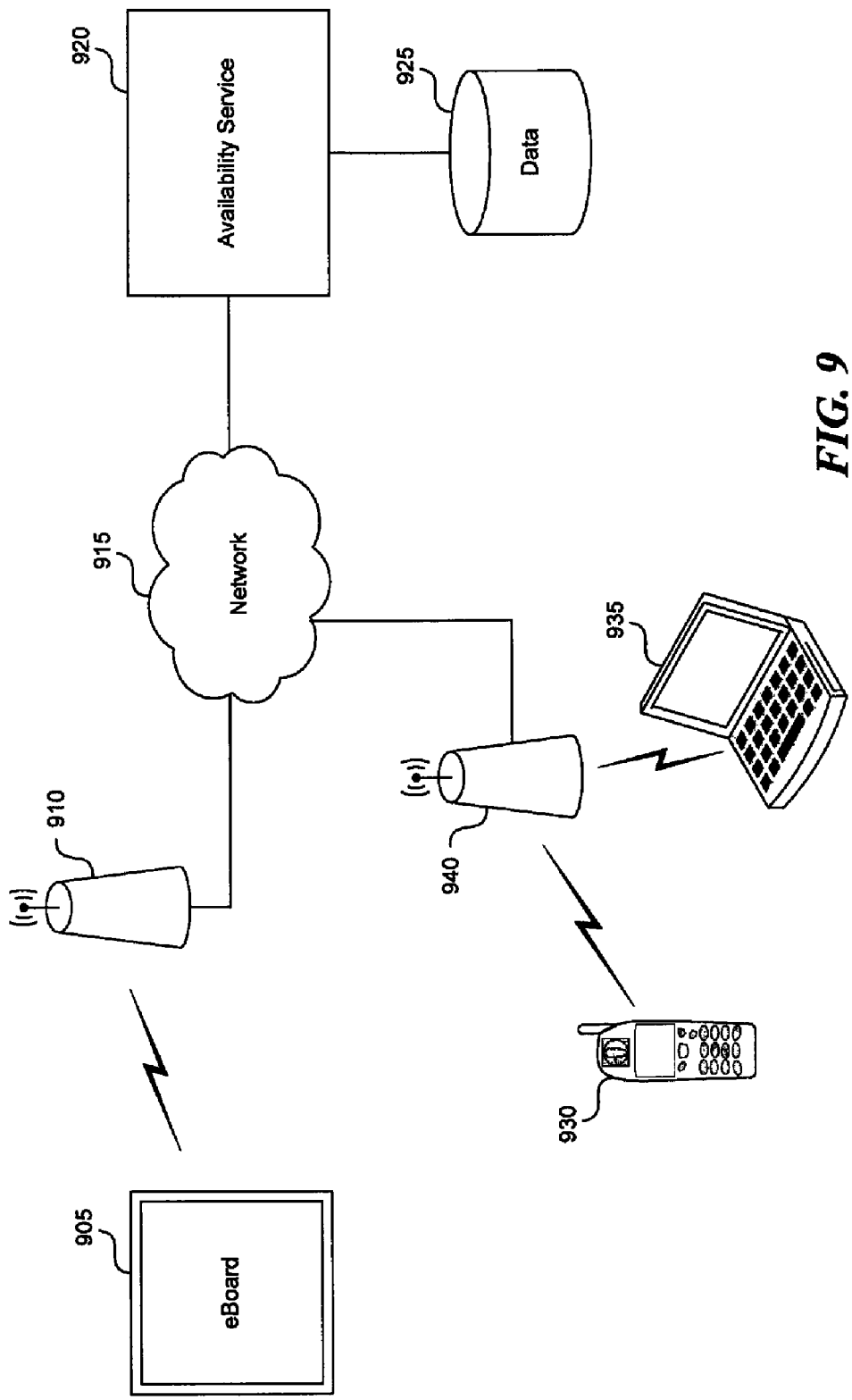
FIG. 9 is a block diagram of a representative system for receiving and/or accessing recipients' availability information.

FIG. 9 is a block diagram illustrating a representative system whereby the facility may obtain information about the recipients' availability 825. Availability information may be automatically or manually communicated from a recipient's electronic device, such as mobile device 930, laptop computer 935, or other device, to an availability service 920 via a wireless access point 940 and a network 915. Once availability information has been received by the availability service 920, the availability service stores the received availability information in a data storage area 925. Each recipient's availability information is stored in an availability record that is associated with the user. The facility may access the availability service 920 via the network 915 in order to retrieve recipients' availability information, the availability service 920 may distribute recipients' availability information to the facility via the network 915, or the recipients' availability information may otherwise be made available to the facility. In some embodiments, rather than obtaining recipients' availability information from an availability service 920, recipients may provide availability information directly to the facility. That is, information may be transmitted directly from a user's mobile device 930, laptop computer 935, or other messaging device to an eBoard 905 via network 915 and wireless access point 910. One skilled in the art will appreciate that availability information may be communicated by recipients and/or their devices and services to the facility in a combination of these and other ways.

Availability information may be manually set by a recipient. For example, a recipient may manually set an indication of "do not disturb" if the recipient does not wish to be interrupted for a certain period of time. As another example, a recipient may manually set an indication of his location, such as "at Starbucks." As still another example, recipients may specify availability information to be associated with each appointment or meeting added to the recipient's calendar. For example, a recipient may select an indication of "out of office" to be associated with an appointment away from the office, but may select an indication of "available" as to be associated with a casual lunch.

Alternatively or additionally, availability information about a recipient may be automatically inferred by a recipient's device, service, or the facility based on the recipient's actions, location, calendar, and other information associated with the recipient. For example, if a recipient's mobile phone is set to "silent," the facility may infer that the recipient is "unavailable." As another example, if a recipient's calendar indicates that the recipient currently has a meeting scheduled, the facility may infer that the recipient "busy" or "in a meeting" for some or all of the recipient's devices and services. As still another example, the facility may automatically infer a recipient's location based on information provided by a location-based service or the location of a network element.

Once the facility has determined the availability 825 of a recipient and assessed a preferred method or methods of delivering a message based on the availability information, the facility may modify its determination of the delivery method for a message based on preferences 830 associated with the recipient. Preferences may be defined by the system 865 or by the recipient 870. The facility may use common rules to determine the best delivery method for delivery of a message based on a certain set of availability information, regardless of the recipient with whom the availability information is associated. For example, standard rules may specify that the best delivery methods when a recipient is "online" are email, instant messaging, phone, and eBoard; or that the best delivery methods when a recipient is "commuting" are phone, SMS messaging, and eBoard. The facility may also set preferences to comply with legal and other rules. For example, the facility may refrain from delivering messages to a user's mobile phone when the user is on a plane.

Alternatively or additionally, the facility may allow recipients to set preferences for message delivery. Recipients may set general preferences, which apply regardless of the availability of the recipient, and/or recipients may set preferences that vary based on the availability information associated with the recipient. General delivery preferences may specify methods by which messages may be delivered to the recipient, regardless of the availability of the recipient. For example, if a recipient has an email account but does not check it very often, the recipient may not permit messages to be delivered via email. Alternatively or additionally, each recipient may rank delivery options in order of preference. For example, a recipient may indicate that he prefers to be contacted first by phone, next by SMS message, and finally by email. A recipient's delivery preferences may be stored on a device, by a service, by the facility, or may be stored in another manner. For example, recipients' delivery preferences may be stored by the facility in an appropriate data structure, such as data structure 500 described above in reference to FIG. 5. Column 520 of FIG. 5 contains recipients' preferred delivery methods. For example, row 530 of FIG. 5 indicates that Mom prefers to be contacted first by phone, then by email, and finally by leaving messages on the eBoard. A recipient need not rank as a preferred delivery method each of the addresses that have been provided to the facility. For example, the recipient who does not check his email often may provide an email address to the facility, but may not rank it as a preferred delivery method.

Alternatively or additionally, the facility may allow a recipient to set preferences for message delivery based on the availability of the recipient. In some embodiments, the facility allows each recipient to establish his or her own delivery profiles that specify which delivery options are available based on the availability information associated with the recipient. Delivery profiles set by a recipient may override the common rules used by the facility. For example, a recipient who commutes to work on a bus that offers Wi-Fi access may establish a "commuting" delivery profile that specifies available delivery options of email, instant messaging, phone, SMS messaging, and eBoard. These delivery options may override the more limited delivery options specified by the facility's standard rules. In addition, delivery profiles may allow recipients to set delivery preferences for availability information for which the facility does not have common rules. For example, a recipient may establish a "driving" profile that limits available delivery options to voice communications by phone.

A recipient may also specify delivery preferences based on the recipient's schedule, the type of message to be delivered, and other information. For example, a recipient may specify that his boss may contact him on his mobile phone outside of business hours, but that his other coworkers may not. Or, a recipient may specify that he prefers to receive all communications via email during business hours, but prefers to receive all communications via his mobile phone during non-business hours. The facility may determine whether a recipient is at work or not based on activity, location, schedule, or other information associated with the recipient. Recipients may also set delivery preferences based on the type of message to be delivered. For example, a recipient may specify that digital photographs are to be delivered to the recipient's eFrame. As another example, a recipient may specify that he prefers to receive messages that include both text and images via email, an eBoard, or mobile phone.

Alternatively or additionally, recipients may specify delivery preferences that vary based on a network (e.g., WiMax, EDGE, UMTS, Wi-Fi, etc.) to which the recipients are connected. For example, a recipient may specify that the associated costs of using a network be taken into account when selecting a delivery method. For instance, recipients may set delivery preferences based on billing costs and types, such as per-minute charges on a high speed network, number of free messages remaining on a mobile phone network, storage space remaining on an email network, time periods of reduced cost on a mobile phone network, and other billing costs and types, Recipients' preferences may be used by the facility to modify the determination of best delivery methods generated by the facility's analysis of availability information. For example, if the availability analysis indicates that, based on the recipient's current availability, the best delivery method for a message is email but the recipient prefers not to be contacted by email, the facility may select a second best delivery method, such as text message. As another example, if the availability analysis indicates that the best delivery methods for a message are (1) email, (2) text message, and (3) eBoard, but the recipient has ranked his delivery preferences as (1) text message, (2) email, and (3) eBoard, the facility may deliver the message first by text message, rather than by email.

In analyzing a recipient's availability and preference information, the facility seeks to deliver the most media-rich message to the recipient via an appropriate device or service of the recipient. For example, if a user has sent a recipient a video message, the richest message may be received by the recipient if the message is delivered to the recipient's video iPod, rather than to the recipient's mobile phone. As another example, if a message contains only text, the facility may deliver the message to any of a recipient's devices or services that support text, and may select the device or service to which the message may be delivered the quickest.

While the facility prefers to send a message to a recipient in the most media-rich format, in some cases the recipient is not available to receive such a message format, or prefers not to receive such a message format. Thus, once the facility has analyzed recipients' availability and preference information, the facility may need to transcode 815 the message composed by the user. That is, the facility may modify the message or convert the message to a different format. For example, if a user composes a voice message for a recipient, but the recipient is unavailable or prefers not to receive a voice message, the facility may transcribe the message and send a text version of the message to the recipient. Alternatively or additionally, if the recipient is unavailable to receive a certain message format, the facility may send a notification to a recipient that a message in such format is available for the recipient. For example, if a user composes a video message for a recipient who is currently unavailable to receive a video message, the facility may send the video message to the recipient's email account, and may send a text message to the recipient indicating that the video message has been so delivered.

Once the facility has analyzed a recipient's availability and preferences, and has trancoded a message if necessary, the facility delivers 820 the message to the recipient via one or more of the selected delivery methods. A message may be delivered simultaneously 875 to several of a recipient's devices and/or services, or the message may be delivered sequentially 880 to different devices and/or services of the recipient until the recipient opens the message. For example, a text message may be delivered simultaneously 875 to the recipient's mobile phone, email account, and eBoard. This offers the recipient multiple opportunities to receive the message, depending on which device and/or service the recipient accesses first. Once a message is opened on one of the devices or services to which the message has been simultaneously delivered, the message may be marked as read on the other devices and/or services to which the message was delivered.

Alternatively, the facility may deliver a message sequentially 880 to different devices and/or services of a recipient until the recipient opens the message. That is, the facility may reroute the message until it is accessed by the recipient. For example, the facility may first send a text message to a recipient during work or school hours. If the recipient has not opened the message by the time work or school is over (as indicated by the recipient's location, schedule, time of day, or other information), the facility may subsequently send the message to another of the recipient's devices or services. The facility may send the same version of the message to another device or service of the recipient, or the facility may transcode the message and send a different version of the message to another device or service. In the above example, if the recipient has not yet opened the text message, the facility may send a text message to the recipient's email account or may convert the text message to a voice message and send the converted message to the recipient's mobile phone.

In some embodiments, the facility may cause a message to "self destruct," or to be automatically recalled, at an appointed time. For example, a time-sensitive message—e.g., "Join me for dinner at 8:00 p.m." —may be automatically recalled by the facility if the message is not opened and/or answered by the recipient by a given time, such as a time designated in the message, a certain window of time thereafter, or at another appointed time (e.g., all unanswered messages having a timeframe for a response are cleared at the end of the day that the response was due).

In some embodiments, once the facility has analyzed recipients' availability and preference information, the facility may display the recipients' availability and/or preference information to a user on one or more eBoard interfaces. Availability and/or preference information may be displayed in a variety of ways, including by displaying an icon and/or text associated with a recipient's icon, displaying a recipient's icon in a variety of colors based on the recipient's availability and/or preferences, displaying a grayed-out or color version of the recipient's icon based on the recipient's availability and/or preferences, and in other ways. For example, availability and/or preference information may be displayed in a bubble, box, window, or other object associated with an icon of the respective recipient. Returning to FIG. 4, the recipient identified by icon 415 has an indication of "At the mall" displayed in a bubble 445 associated with his icon. Alternatively or additionally, the facility may display availability and/or preference information to an eBoard user once the user hovers over, clicks on, taps, or otherwise accesses a recipient's icon. One skilled in the art will appreciate that availability and/or preference information may be displayed by the facility in these and other ways.

Returning to FIG. 9, to display recipients' availability and/or preference information on one or more interfaces of the eBoard 905, the facility may communicate with the eBoard 905 in a variety of ways, such as via the network 915, an unlicensed mobile access (UMA) network, or another network, through a wireless access point 910, a wireline connection, or another network connection. For example, the facility may communicate with the eBoard 905 via the network 915 through the same wireless access point by which recipients' availability information is received, such as wireless access point 940.

Figure 10:
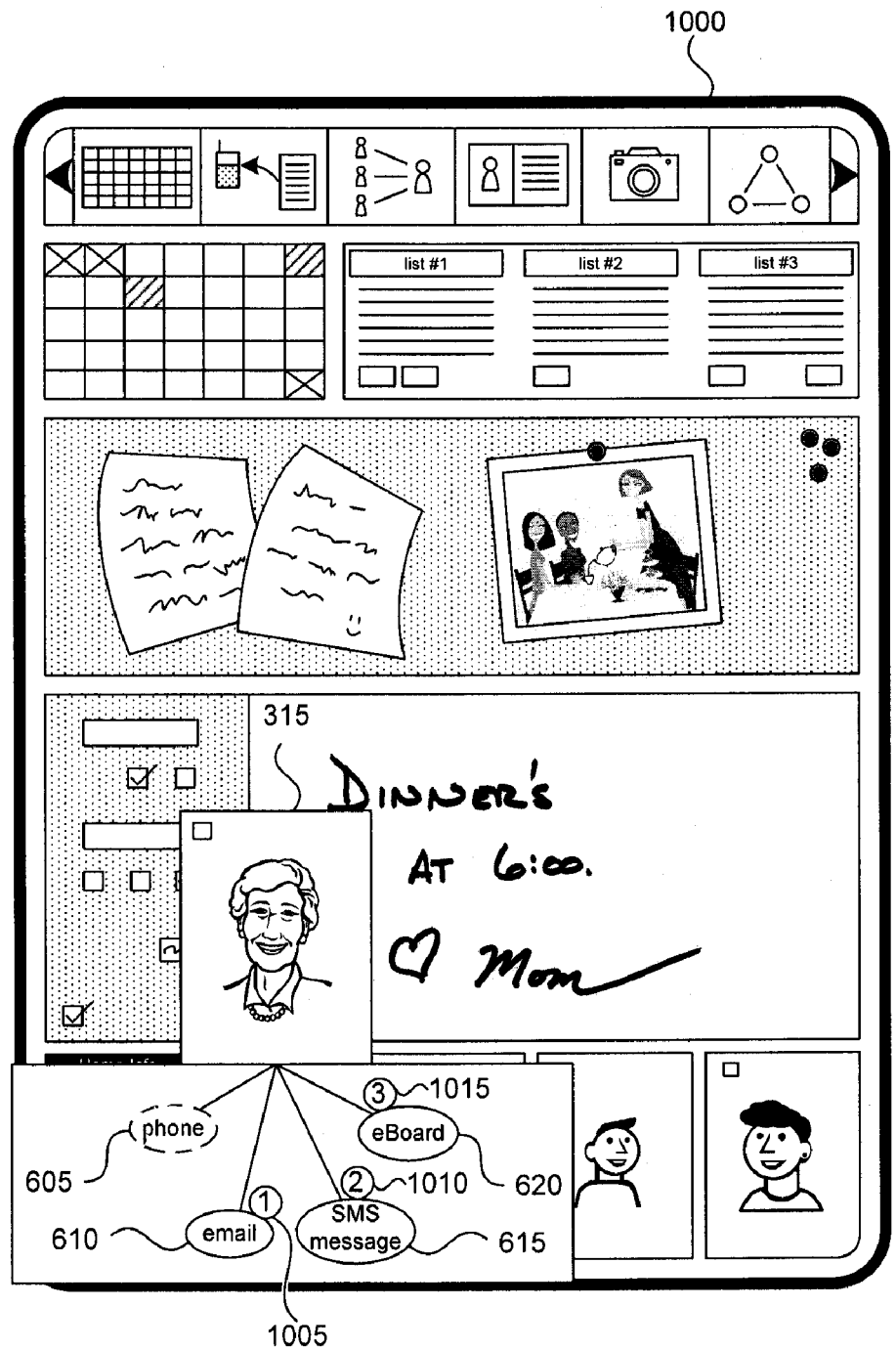
FIG. 10 is a representative screen shot depicting the display of availability and/or preference information associated with each of a recipient's delivery options.

The facility may display availability and/or preference information separately for each of a recipient's devices and services, or it may display combined availability and/or preference information that indicates the recipient's overall availability across the recipient's devices and services. For example, as illustrated by FIG. 10, the facility may display an indication of availability and/or preference information associated with each delivery option. FIG. 10 is a representative screenshot of an interface 1000 that the facility may use to display availability and/or preferences associated with each of a recipient's delivery options. For example, the facility may display an indication of the ranking of each delivery option, based on the analysis of the availability and preferences of the recipient. FIG. 10 depicts a "1" icon 1005 associated with email delivery option 610, a "2" icon 1010 associated with SMS delivery option 615, and a "3" icon 1015 associated with eBoard delivery option 620, indicating the order in which delivery options are recommended based on the recipient's current availability and/or preferences. In addition, the facility may display an indication that one or more delivery options are unavailable for the recipient. For example, FIG. 10 depicts phone delivery option 605 grayed-out, indicating that the recipient associated with icon 315 is currently unavailable by phone.

Alternatively or additionally, the facility may display combined availability and/or preference information that indicates the recipient's overall availability across the recipient's devices and services. For example, if a recipient is not logged in to his computer, has an activity state of "away" on IM, and has an activity state of "do not disturb" on his mobile phone, the facility may convey combined availability and/or preference information of "unavailable." The facility, an availability service, or one or more of the recipient's devices and services may use a set of rules to combine the user's availability and/or preferences on multiple devices and services, or may otherwise determine a recipient's combined availability and/or preference information.

In addition to indicating a recipient's current availability, displayed availability and/or preference information may convey the recipient's future availability. For example, the facility may indicate when the recipient will be available based on the recipient's calendar. As an example, the facility may indicate that the recipient is "in a meeting until 4:00 p.m." The facility may also indicate that the recipient is currently available but will later be busy. For example, the facility may indicate that the recipient is "available, but in a meeting from 4:00-4:45 p.m." Displayed availability and/or preference information may also indicate upcoming dates, including birthdays and other important events.

Displayed availability and/or preference information may also include information regarding the proximity of recipients' devices to the eBoard. For example, devices that are in proximity to the eBoard and services that are accessible through these devices may be displayed in one color to a user, while devices that are not in proximity to the eBoard and services that are accessible through these remote devices may be displayed in another color to the user. The facility may also indicate the proximity of devices and services in a variety of other ways, including through the use of symbols, differing icon size, differences in icon saturation, or in a combination of these and other ways. Based on displayed indications of proximity, a user can make decisions regarding message delivery. For example, if a user wishes to deliver a message to a recipient who is known to the user to be away from an office, and thus not in proximity to an eBoard at the office, the user may deliver the message to a device or service of the recipient that is indicated not to be in proximity to the eBoard, rather than to a device or service of the recipient that is indicated to be in proximity to the office eBoard.

Based on displayed availability and/or preference information associated with a recipient, a user who wishes to contact the recipient is able to make better informed decisions regarding which form of communication to use, when delivery of a message should occur, and other features associated with message delivery.

Because availability information conveys personal information about a recipient's activities, location, schedule, and other attributes associated with a recipient, recipients may set limits on the availability information that may be conveyed to other users. For example, a recipient may define various groups of users and may set different privileges for each group that specify the group members' ability to access the recipient's availability information. These groups and privileges may be stored by a device or service of the recipient, by the facility, or by an availability service in association with the recipient's personal availability record. A recipient may, for example, allow friends and family members to see more availability information than may be seen by coworkers. As another example, a recipient may only allow coworkers to see the recipient's availability information during working hours.

In some embodiments, the facility permits a user to associate a message with a recipient regardless of the availability and/or preference information associated with the recipient. In such embodiments, if a user associates a message with an unavailable recipient, the facility may hold the associated message for delivery until the recipient is available. The facility may display an alert to the user that indicates that the recipient is not currently available to receive messages, and/or that the message will be held for delivery until the recipient is available. In other embodiments, the facility only permits a user to associate a message with a recipient whose availability and/or preference information specifies that the recipient is available through at least one of the recipient's devices or services.

In some embodiments, once the user has indicated that a message is to be delivered to one or more recipients, the facility presents the user with a variety of delivery options for the message. These delivery options may include various devices associated with the recipient(s), such as phone, picture frame, eBoard, an "eFrame," a satellite messaging device, and other devices. Delivery options may also include various services utilized by the recipient(s), such as email, SMS messaging, MMS messaging, instant messaging, and other services. The facility may determine which delivery options are suitable for a given message based on the addresses associated with the intended message recipient in an appropriate data structure, such as data structure 500 described above in reference to FIG. 5. For example, if the user has specified that a message is to be delivered to Dad, row 535 of FIG. 5 indicates that appropriate delivery options include phone, SMS, email, and eBoard.

The delivery options presented by the facility may vary dynamically based on a variety of factors, including availability and/or preference information associated with the respective recipients, as described above.

The facility may communicate recipients' availability and delivery preferences to the user, such as by presenting the delivery options to the user in the order in which they have been ranked by the recipient. In the example above, the facility may present the delivery options for the recipient in a vertical list, with "phone" listed first, "SMS message" listed second, and "email" listed third. The facility may also communicate recipients' delivery preferences by numbering, color-coding, or otherwise highlighting the preferred delivery options.

The delivery options presented by the facility may also vary dynamically based on the type of message to be delivered and the capabilities of the recipient's devices and services, as described above. For example, if a recipient's phone does not support images, the facility may not provide "phone" as an option for delivery of a message that includes a photo, but may provide "phone" as an option for delivery of a message that is only text.

Figure 6:
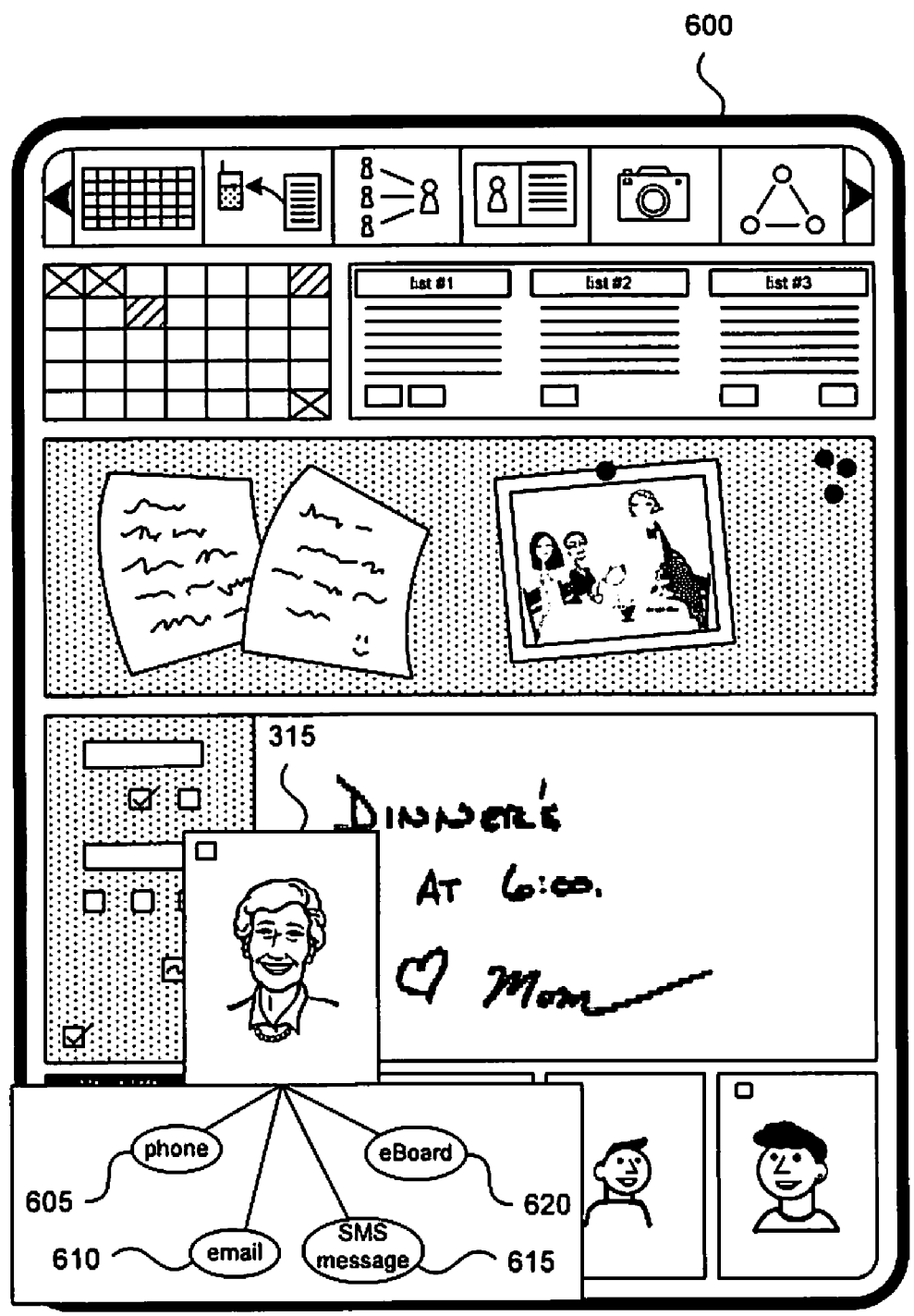
FIG. 6 is a representative screenshot depicting various delivery options that may be presented for delivery of a message.

Once the facility determines suitable delivery options for a message, these options may be presented to the user. FIG. 6 is a representative screenshot of an interface 600 that the facility may use to present delivery options. For example, when Mom associates a message with Dad's icon 315, Mom may be presented with options including "phone" 605, "email" 610, "SMS message" 615, "eBoard" 620, and other options. Mom can select the method by which she would like the message to be delivered. For example, if Mom knows that Dad is commuting home, and is not at the office, Mom may decide to deliver the message to Dad via an SMS message 615.

In some embodiments, messages may also be delivered to one or more recipients directly via the interface. For example, one of the delivery options associated with a recipient may be "eBoard," which may correspond to the messaging device shared by the recipient and the user, or which may correspond to a messaging device owned by the recipient. For example, before bed, Mom may compose a message for her son, John, that reads "Don't forget your soccer uniform!" Mom may associate the message with John's icon and select the "eBoard" delivery method. The next morning, before John leaves for school, he can check the eBoard to see if he has any messages. Similarly, if a satellite messaging device is associated with John, he can check the satellite messaging device to see if he has any messages. In either embodiment, John can read Mom's note and make sure he has his soccer uniform.

The facility may present the delivery options to the user before, during, or after a message has been associated with recipient(s). For example, after a user has associated a message with a recipient's icon, the facility may provide delivery options to the user. The user may select one of the presented delivery options, such as by touching the option with a stylus or other implement. Alternatively, the facility may present the delivery options while the user is associating the message, before the user has finally associated the message with the recipient's icon. For example, in a "drag-and-drop" embodiment, once the user has dragged a message such that it is touching or within the vicinity of the recipient's icon, the facility may present the delivery options to the user. The user may select a delivery method by dropping the message onto the desired delivery option. Returning to FIG. 6 and the example above, Mom may drag a message onto Dad's icon 315, be presented with the available delivery options 605, 610, 615, and 620, and drop the message onto an "SMS message" delivery option 615. If no delivery method is selected by the user, the facility may select a default delivery method as previously described.

In some embodiments, the facility displays only those delivery options that are associated with devices and services on which a recipient is currently available. In other embodiments, the facility displays all delivery options associated with the recipient, regardless of the availability of the recipient via the respective delivery options. In such embodiments, the facility may display available delivery options in a different manner than unavailable delivery options. For example, available delivery options may be displayed by the facility as usual, while unavailable delivery options may be displayed grayed-out or otherwise diminished. In addition, in some embodiments the facility may permit the user to select an unavailable delivery option, while in other embodiments the facility may prohibit the user from selecting an unavailable delivery option. If the facility permits the user to select an unavailable delivery option, the facility may hold the message for delivery until the recipient is available via that delivery option. The facility may display an alert to the user that the message is not currently deliverable via the selected delivery option, and/or that the message will be held for delivery until the recipient is available via that delivery option. If the facility prohibits the user from selecting an unavailable delivery option, the unavailable delivery options may still be displayed to the user as an indication that the recipient is sometimes available via these delivery options, and that the recipient may be available via these delivery options at a later time.

In addition, the facility may display delivery options differently depending on the availability of a recipient via each delivery option. For example, delivery options may be presented in a variety of colors or sizes, accompanied by varying symbols or icons, or distinguished in a combination of these and other ways. If a recipient is not available via any delivery option associated with the recipient's devices and services, the facility may display the recipient's icon in a different manner. For example, the facility may display a modified version of the recipient's icon, such as an icon that is grayed-out, smaller, of a different color, and/or distinguished in another way. As depicted in FIG. 4, a grayed-out icon 430 may indicate that the recipient identified by the icon 430 is not currently available on any of that recipient's devices or services.

In some embodiments, once a delivery method has been selected by the user, the facility presents the user with additional selections regarding the time and/or urgency of delivery. Selections for delivery time may include "urgent," "now," and "later." If a user indicates that a message is urgent, the facility may mark the message accordingly upon delivery to the recipient. For example, a voicemail message may be designated as urgent, or an email may be marked as a high priority. Alternatively, the user may set a message to be delivered to a recipient at a later time. For example, a user may wish to have a message delivered at a particular time, such as an hour before an appointment, to remind the recipient about the appointment. As another example, a user may wish to have a message delivered on a particular date, such as a recipient's birthday. Alternatively, the user may set a message to be delivered now, and the facility will deliver the message to the recipient presently.

The selections presented by the facility regarding the time and/or urgency of delivery may vary based on the availability and/or preference information of the intended recipient. For example, if availability information of "in a meeting" is associated with the recipient, the facility may not provide a selection of "now" for delivery of a message. Alternatively, the facility may provide "now" as a selection, but may display an alert to the user that the message will be held for delivery until the recipient is available. Alternatively or additionally, the facility may display available and unavailable delivery times in a different manner, such as in different colors or formats. In the above example, available delivery times of "urgent" and "later" may be presented in one color, while the unavailable delivery time of "now" may be presented in a different color. As with the delivery options described above, the facility may permit or prohibit the user from selecting an unavailable delivery time for delivery of a message.

The selections presented by the facility regarding the time and/or urgency of delivery may also vary based on a delivery profile set by a recipient, as described above. For example, a recipient may define that the only available delivery options when the recipient is "in a meeting" are "urgent" and "later." As above, these delivery profiles may override standard rules used by the facility to specify delivery time options associated with given availability information, and/or specify delivery time options for availability information that is otherwise not defined by the facility.

Figure 7:
FIG. 7 is a representative screenshot depicting delivery of a message to a group of recipients.

In some cases, a user may wish to deliver a message to multiple recipients at once. For example, Mom may want to remind the entire family about dinner time. FIG. 7 is a representative screenshot of an interface 700 depicting delivery of a message to multiple recipients. In some embodiments, to send a message to multiple recipients a user may simultaneously associate the message with the desired recipients, such as by a drag-and-drop or pop-and-hop motion to the desired recipients. The facility may permit the user to simultaneously associate a message with multiple recipients regardless of the availability information associated with each of the recipients, or the facility may only permit the user to simultaneously associate a message with multiple recipients whose availability information specifies that they are available. In other embodiments, to send a message to multiple recipients a user may first indicate the recipients to whom the message is to be delivered, such as by drawing a circle 705 around the desired recipients' icons 315 and 320 with a stylus or other implement. In such embodiments, the facility may permit the user to circle multiple icons regardless of the availability information associated with each of the recipients represented by the icons, or the facility may only permit the user to circle multiple icons whose availability information specifies that the recipients represented by the icons are available. In some embodiments, the circle 705 drawn by the user is displayed on the interface 700. Alternatively or additionally, when the User draws a circle around a group of recipients, the facility may display an indication that the circled recipients are the active selection. For example, the facility may highlight, enlarge, or tag the icons of the circled recipients, or may otherwise indicate that the recipients are the active selection. Once a group of recipients has been circled, the user may associate the message with the circle 705 to deliver the message to all of the circled recipients. For example, in a drag-and-drop embodiment, if John wants to send a message to Mom and Dad reminding them about the school play, John can compose a message 710, draw a circle 705 around Mom and Dad's icons 315 and 320, and drag the message 710 to the circled area. In some embodiments, the circle 705 may disappear after the message 710 has been associated with the circle 705. Alternatively or additionally, any displayed indication of the active selection of the group, such as highlighting, enlargement, or tagging of the recipients' icons, may disappear after the message has been associated with the group of recipients.

Alternatively or additionally, to send a message to multiple recipients at once, the facility may allow the user to create an icon that represents a group of recipients. Like an individual recipient, each group may be represented on the interface by an icon, photograph, or other graphic. For example, a user's family may be represented by a house icon, a digital photograph of the user's family, or another icon. Returning to FIG. 3, icon 335 may represent a group, such as the user's family. Alternatively or additionally, group icons may be distinguishable from icons that are associated with individual recipients. For example, group icons may have a particular shape, such as a box, bucket, envelope, or other icon.

In some embodiments, once a group icon has been selected, the user may associate recipients with the group icon in order to define or populate the group. For example, a user may select a box labeled "Family" as an icon to represent his family, and may associate each of his family members' icons with the "Family" box. (Note that, unless so indicated by the user, associating a recipient with a group does not remove the recipient's individual icon from the interface; it simply adds the recipient to a group.) Returning to FIG. 3, Mom may set up a family group by associating icons 315, 320, 325, and 330—via a "drag-and-drop" motion, a "pop-and-hop" motion, or similar touchscreen-enabled interface—with the group icon 335.

The facility may store indications of the groups of which each recipient is a member in an appropriate data structure, such as data structure 500 described above in reference to FIG. 5. Column 525 of FIG. 5 illustrates indications of group membership. For example, once Mom has established the family group described above, the facility may associate the "Family" group with each of Mom, Dad, John, and Kate. In addition, FIG. 5 depicts a "Parents" group comprising Mom and Dad and a "Kids" group comprising John and Kate. Groups may also contain recipients not depicted as individual recipients on the eBoard. For example, Mom may be the "team mom" for Kate's soccer team and may need to send messages periodically to all members of the team. Mom may set up a "Kate's Soccer Team" group, which may include Kate (as indicated in row 545 of FIG. 5) and Kate's teammates, who are not otherwise represented on the eBoard. A group that includes recipients not individually represented on the eBoard may be defined by a user in a number of ways, such as by accessing a menu option, preference, or setting associated with the group.

In some embodiments, after recipients have been added to the group, the user may associate messages with the group icon to deliver the messages to each of the members of the group. For example, Mom may associate message 305 with the group icon 335. One skilled in the art will appreciate that these steps may be performed in an order that is different than the order described. For example, a user may first associate messages with a group icon and then associate the recipients with the group icon. As another example, the user may alternately associate messages and recipients with the group icon. Each message associated with the group icon will be delivered to each of the recipients in the group.

In some embodiments, groups established via a group icon may reside on the interface until the user indicates that the group is to be removed or deleted. This may be useful, for example, when the user expects to make use of the same group of recipients on a repeated basis. For example, a group of recipients that may be used often is the user's family. Alternatively or additionally, groups established via a group icon may reside on the interface for a limited duration or event, and may disappear without the user affirmatively indicating that the group should be removed or deleted. This may be useful, for example, when the user wants to set up a group of a few friends to receive a particular message. In some embodiments, a group may disappear after it is used by the user to deliver a particular message. Alternatively or additionally, a group may be removed from the interface once it has remained unused for a certain period of time, such as a week, a month, or another period of time.

In some embodiments, messages are delivered to all members of a group by the same delivery method. The facility may display to the user only those delivery options that are shared among the group members. For example, Mom may have a mobile phone, email, and a digital picture frame; and Dad may have a mobile phone, email, and SMS messaging. When John sends a message to a group comprising Mom and Dad, John may be presented with delivery options that include "phone" and "email." As another example, the facility may display to the user only those delivery options by which all recipients are currently available, as conveyed by the recipients' availability information. In the above example, if Dad is online but Mom is not, John may only be presented with the delivery option of "phone." Alternatively or additionally, messages may be delivered to each member of a group by a delivery method specific to the recipient and/or the devices associated with the recipient. For example, if John wants to send a digital photograph to both Mom and Dad, John may send the photograph to Mom's digital picture frame, but to Dad's email. That is, if John prefers to have the photo displayed by a digital picture frame, he can choose that method of delivery for those users who have such a device; for other users, he can choose an alternate method of delivery, such as email. In such embodiments, the facility or the user may also select a delivery method for each recipient based on the availability and/or preference information associated with the recipient. For example, if Dad is online, John may want to send the photograph to Dad's email, but if Dad is offline, John may want to send the photograph to Dad's phone. If a member of the group is currently unavailable to receive messages, as indicated by availability information associated with the group member, the facility may hold the message for delivery to the unavailable group member until he or she becomes available. The facility may display an alert to the user that the message is currently undeliverable to the unavailable group member.

The presence of a message may be indicated to a recipient in a variety of ways. In some embodiments, when a recipient has messages waiting, the facility may display a message icon in association with the recipient's icon. For example, an envelope, asterisk, star, or other icon may indicate the presence of a message. In addition, the facility may indicate the number of messages that are waiting for the recipient. For example, returning to FIG. 4, icon 435 may indicate that the recipient 425 has four messages waiting. In some embodiments, message icons, numbers of messages waiting, and other indicators that a recipient has messages waiting may indicate the presence and number of messages waiting for the recipient on all of the recipient's devices. In other embodiments, these indicators may indicate only the presence and number of messages that have been delivered to the recipient by the eBoard delivery option (i.e., to be viewed on the eBoard). In addition, if a recipient has an urgent message waiting, the facility may display an additional icon, such as an exclamation point, asterisk, or another icon, in addition to the message waiting icon. Alternatively or additionally, the presence of an urgent message may be indicated by a message waiting icon that is displayed in a different color, bolded, or in another manner. Alternatively or additionally, the facility may present an indication that a transmitted message has been read by the recipient. One skilled in the art will appreciate that message indicators may indicate the presence and attributes of messages in other manners.

One skilled in the art will appreciate that the steps described above may be performed in an order other than the order described. For example, in some embodiments, the user may begin a communication with a recipient by first selecting the recipient to whom the message will be sent. Once the user has selected the recipient, the user may compose a message and select a delivery method as described above, and the facility will deliver the message to the selected recipient via the selected delivery method. In still other embodiments, the user may begin a communication with a recipient by first selecting the delivery method by which the message will be delivered. Once the delivery method has been selected, the user may compose a message and select a desired recipient as described above, and the facility will deliver the message to the selected recipient via the selected delivery method. In addition, messages may be composed and delivered in an order or manner other than those described herein.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of automatically selecting a delivery method for delivery of an electronic message to a recipient based on availability information associated with the recipient, the method comprising:

displaying a plurality of icons, each of the plurality of icons corresponding to one or more recipients, wherein at least one of the plurality of icons is a group icon corresponding to a group of two or more recipients; receiving a composition of an electronic message;

receiving a user's selection of group icon indicating that the two or more recipients in the group corresponding to the selected group icon are intended recipients of the electronic message;

retrieving availability information associated with at least one recipient in the group corresponding to the selected group icon, wherein the availability information is retrieved from at least one electronic device or service of the at least one recipient;

analyzing the retrieved availability information to determine an availability of the at least one recipient;

selecting a delivery method from a plurality of delivery methods for delivering the electronic message to the at least one recipient, wherein the selection is made based at least in part on the determined availability of the at least one recipient;

transmitting the electronic message to the at least one recipient in the group via the selected delivery method; and transmitting the electronic message to the other recipients in the group via a delivery method that is different than the selected delivery method.

2. The method of claim 1, wherein the delivery method is selected at least in part based on an electronic device of the at least one recipient.

3. The method of claim 1, wherein the delivery method is selected at least in part based on an electronic service accessed by an electronic device of the at least one recipient.

4. The method of claim 1, wherein selecting the delivery method from a plurality of delivery methods includes selecting a delivery method that allows the electronic message to be transmitted to the at least one recipient in a most media-rich format based on the availability of the at least one recipient.

5. The method of claim 4 further comprising, when the most media-rich format based on the availability of the at least one recipient is different from a format in which the electronic message was received:

converting the received electronic message to an alternate format based on the selected delivery method; and transmitting the electronic message to the at least one recipient in the alternate format.

6. The method of claim 1, wherein the availability information includes information related to a current activity in which the at least one recipient is participating.

7. The method of claim 1, wherein the availability information includes information related to a location of the at least one recipient.

8. The method of claim 1, wherein the availability information includes information related to the capabilities of at least one electronic device of the at least one recipient.

9. The method of claim 1, wherein the availability information includes information related to a sensor in at least one electronic device of the at least one recipient.

10. The method of claim 1, wherein the availability information includes information related to at least one service accessed by an electronic device of the at least one recipient.

11. The method of claim 1, wherein the availability information includes information related to a schedule of the at least one recipient.

12. The method of claim 1, further comprising:

selecting at least one additional delivery method from the plurality of delivery methods for delivering the electronic message to the at least one recipient, wherein the selection is made based at least in part on the determined availability of the at least one recipient; and transmitting the electronic message to the at least one recipient via the selected at least one delivery method.

13. The method of claim 1 further comprising:
retrieving delivery method preferences associated with the at least one recipient;
analyzing the retrieved delivery method preferences; and
modifying the selected delivery method based at least in part on the analysis of the retrieved delivery method preferences.

14. The method of claim 13, wherein the delivery method preferences have been automatically set based on potential sets of retrieved availability information.

15. The method of claim 13, wherein the message delivery preferences have been manually set by the at least one recipient.

16. A non-transitory computer readable medium containing instructions that, when executed by a processor, perform a method for automatically selecting a delivery method for delivery of an electronic message to a recipient based on availability information associated with the recipient, the method comprising:
displaying a plurality of icons, each of the plurality of icons corresponding to one or more recipients, wherein at least one of the plurality of icons is a group icon corresponding to a group of two or more recipients;
receiving a composition of an electronic message;
receiving a user's selection of the group icon indicating that the two or more recipients in the group corresponding to the selected group icon are intended recipients of the electronic message;
retrieving availability information associated with at least one recipient in the group corresponding to the selected group icon, wherein the availability information is retrieved from at least one electronic device or service of the at least one recipient;
analyzing the retrieved availability information to determine an availability of the at least one recipient;
selecting a delivery method from a plurality of delivery methods for delivering the electronic message to the at least one recipient, wherein the selection is made based at least in part on the determined availability of the at least one recipient;
transmitting the electronic message to the at least one recipient in the group via the selected delivery method; and
transmitting the electronic message to the other recipients in the group corresponding to the selected group icon via a delivery method that is different than the selected delivery method.

17. The non-transitory computer-readable medium of claim 16, wherein the delivery method is selected at least in part based on an electronic device of the at least one recipient.

18. The non-transitory computer-readable medium of claim 16, wherein the delivery method is selected at least in part based on an electronic service accessed by an electronic device of the at least one recipient.

19. The non-transitory computer-readable medium of claim 16, wherein the availability information has been manually set by the at least one recipient.

20. The non-transitory computer-readable medium of claim 16, wherein the availability information has been automatically set based on information associated with the at least one recipient.

21. The non-transitory computer-readable medium of claim 20, wherein the availability information is selected from the set consisting of information related to a current activity in which the at least one recipient is participating, a location of the at least one recipient, the capabilities of at least one electronic device of the at least one recipient, an output from a sensor in at least one electronic device of the at least one recipient, an indication of at least one service accessed by an electronic device of the at least one recipient, and a schedule of the at least one recipient.

22. The non-transitory computer-readable medium of claim 16, wherein the method further comprises:
means for retrieving delivery method preferences associated with the at least one recipient;
means for analyzing the retrieved delivery method preferences; and
means for modifying the selected delivery method based at least in part on the analysis of the retrieved delivery method preferences.

23. The non-transitory computer-readable medium of claim 22, wherein the delivery method preferences have been specified by the at least one recipient.

24. The non-transitory computer-readable medium of claim 23, wherein the delivery method preferences apply regardless of the availability information associated with the at least one recipient.

25. The non-transitory computer-readable medium of claim 23, wherein the delivery method preferences vary based on the availability information associated with the at least one recipient.

26. The non-transitory computer-readable medium of claim 23, wherein the delivery method preferences vary based on a network to which the at least one recipient is connected.

27. The non-transitory computer-readable medium of claim 26, wherein the delivery method preferences vary based on costs associated with the network to which the at least one recipient is connected.

28. The non-transitory computer-readable medium of claim 16, wherein the method further comprises:
means for converting the electronic message to an alternate format based on the determined availability of the at least one recipient, wherein the converting occurs prior to transmitting the electronic message to the at least one recipient.

29. The non-transitory computer-readable medium of claim 16, wherein the method further comprises:
means for selecting a second delivery method from the plurality of delivery methods for delivering the electronic message to the at least one recipient, wherein the selection is made based at least in part on the determined availability of the at least one recipient; and
means for transmitting the electronic message to the at least one recipient via the selected second delivery method, wherein the electronic message is transmitted simultaneously to the at least one recipient via the selected delivery method and the selected second delivery method.

30. The non-transitory computer-readable medium of claim 16, wherein the method further comprises:
means for selecting a second delivery method from the plurality of delivery methods for delivering the electronic message to the at least one recipient, wherein the selection is made based at least in part on the determined availability of the at least one recipient; and
means for transmitting the electronic message to the at least one -recipient via the selected second delivery method, wherein the electronic message is transmitted sequentially to the at least one recipient via the selected delivery method and the selected second delivery method.

31. The system of claim 16, further comprising means for automatically recalling the electronic message from the at least one recipient if the at least one recipient has not opened the message by a given time.

32. A system for displaying availability of recipients via a messaging device with a touchscreen display, the system comprising:
- a storage component for storing a plurality of recipients and one or more delivery methods associated with each of the plurality of recipients;
- a retrieval component for accessing availability information associated with at least one of the plurality of recipients;
- an analysis component coupled to the storage component and retrieval component for analyzing the availability information associated with the at least one recipient to determine an availability of the at least one recipient;
- a touchscreen display coupled to the analysis component for:
  - displaying a plurality of icons, each of the plurality of icons being associated with one or more of the plurality of recipients, wherein at least one of the plurality of icons is a group icon associated with a group of two or more recipients;
  - displaying an indication of the determined availability of the at least one recipient; and
  - receiving a user's selection of the group icon indicating that the two or more recipients in the group associated with the selected group icon are intended recipients of an electronic message; and
- a message delivery component for transmitting the electronic message to a recipient in the group via a selected delivery method and transmitting the electronic message to the other recipients in the group via a delivery method that is different than the selected delivery method.

33. The system of claim 32, wherein displaying the indication of the determined availability includes displaying a graphic in association with the icon of the at least one recipient.

34. The system of claim 32, wherein displaying the indication of the determined availability includes displaying text in association with the icon of the at least one recipient.

35. The system of claim 32, wherein displaying the indication of the determined availability comprises modifying the displayed icon of the at least one recipient.

36. The system of claim 32, wherein displaying the indication of the determined availability includes displaying a combined availability that indicates an overall availability of the at least one recipient.

37. The system of claim 32, wherein the touchscreen display further displays one or more of the stored delivery methods associated with the at least one recipient.

38. The system of claim 37, wherein the touchscreen display further displays a separate indication for each of the one or more displayed delivery methods associated with the at least one recipient, the separate indications displayed based on an availability of the at least one recipient via each of the delivery methods.

39. The system of claim 37, wherein the displayed delivery methods vary based on the availability information associated with the at least one recipient.

40. The system of claim 37, wherein the displayed delivery methods are displayed differently based on an availability of the at least one recipient via each of the displayed delivery methods.

41. The system of claim 37, wherein the touchscreen display further displays delivery time options associated with at least one of the displayed delivery methods.

42. The system of claim 41, wherein the displayed delivery time options vary based on the availability information associated with the at least one recipient.

43. The system of claim 41, wherein the displayed delivery time options are displayed differently based on an availability of the at least one recipient via each of the displayed delivery time options.

44. The system of claim 32, wherein the at least one recipient specifies the extent to which the indication of determined availability is displayable by the touchscreen display.

* * * * *